(12) United States Patent
Chen et al.

(10) Patent No.: US 12,154,429 B2
(45) Date of Patent: Nov. 26, 2024

(54) VEHICLE ABNORMALITY MONITORING METHOD, VEHICLE LIGHTING METHOD, AND APPARATUS

(71) Applicant: Huawei Technologies Co., Ltd., Shenzhen (CN)

(72) Inventors: Yao Chen, Beijing (CN); Yuan Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 17/895,495

(22) Filed: Aug. 25, 2022

(65) Prior Publication Data

US 2022/0406183 A1    Dec. 22, 2022

Related U.S. Application Data

(63) Continuation of application No. PCT/CN2020/076668, filed on Feb. 25, 2020.

(51) Int. Cl.

| | |
|---|---|
| *G08G 1/0967* | (2006.01) |
| *G06V 10/60* | (2022.01) |
| *G06V 20/54* | (2022.01) |
| *G06V 20/56* | (2022.01) |
| *G08G 1/01* | (2006.01) |
| *H04W 4/44* | (2018.01) |
| *H05B 47/19* | (2020.01) |

(52) U.S. Cl.
CPC ....... *G08G 1/096766* (2013.01); *G06V 10/60* (2022.01); *G06V 20/54* (2022.01); *G06V 20/56* (2022.01); *G08G 1/0112* (2013.01); *G08G 1/0116* (2013.01); *H04W 4/44* (2018.02); *H05B 47/19* (2020.01)

(58) Field of Classification Search
CPC ........... G08G 1/096766; G08G 1/0112; G08G 1/0116; G08G 1/0133; G08G 1/0175; G08G 1/095; G08G 1/20; G08G 1/205; H04W 4/44; H04W 4/029; H05B 47/19; G06V 10/60; G06V 20/54; G06V 20/56; H04N 7/188; Y02B 20/40
See application file for complete search history.

(56) References Cited

U.S. PATENT DOCUMENTS

| | | |
|---|---|---|
| 2003/0125853 A1 | 7/2003 | Takagi et al. |
| 2009/0231432 A1 | 9/2009 | Grigsy et al. |

(Continued)

FOREIGN PATENT DOCUMENTS

| | | |
|---|---|---|
| CN | 1570980 A | 1/2005 |
| CN | 103425731 A | 12/2013 |

(Continued)

OTHER PUBLICATIONS

Machine Translation of CN 111176294 A. (Year: Jul. 11, 2024).*

*Primary Examiner* — Sisay Yacob
(74) *Attorney, Agent, or Firm* — Conley Rose, P.C.

(57) ABSTRACT

A vehicle abnormality monitoring method includes starting, by a vehicle, a monitoring device to record a first video when detecting an abnormal event; determining a roadside device in an area where the vehicle is located; and sending, to the roadside device, a monitoring request requesting the roadside device to record a second video of the abnormal event, where the first video and the second video are configured to trace the abnormal event.

18 Claims, 6 Drawing Sheets

(56) References Cited

U.S. PATENT DOCUMENTS

| | | | | |
|---|---|---|---|---|
| 2013/0311641 | A1* | 11/2013 | Chow | G08G 1/04 |
| | | | | 709/224 |
| 2016/0261781 | A1* | 9/2016 | Chen | H04N 23/74 |
| 2018/0365983 | A1* | 12/2018 | Karapantelakis | H04W 4/44 |
| 2021/0169417 | A1* | 6/2021 | Burton | A61B 5/4857 |
| 2022/0392282 | A1* | 12/2022 | Schmidt | B60R 11/04 |

FOREIGN PATENT DOCUMENTS

| | | | |
|---|---|---|---|
| CN | 103702485 A | | 4/2014 |
| CN | 104882001 A | | 9/2015 |
| CN | 105959581 A | | 9/2016 |
| CN | 108391350 A | | 8/2018 |
| CN | 109165634 A | | 1/2019 |
| CN | 109218682 A | | 1/2019 |
| CN | 109905672 A | | 6/2019 |
| CN | 110149753 A | | 8/2019 |
| CN | 111176294 A | * | 5/2020 |
| CN | 108604284 B | | 2/2021 |
| EP | 3361723 A1 | | 8/2018 |

\* cited by examiner

VEHICLE ABNORMALITY MONITORING METHOD, VEHICLE LIGHTING METHOD, AND APPARATUS

CROSS-REFERENCE TO RELATED APPLICATIONS

This is a continuation of International Patent Application No. PCT/CN2020/076668 filed on Feb. 25, 2020, which is hereby incorporated by reference in its entirety.

TECHNICAL FIELD

This disclosure relates to the field of intelligent driving or assisted driving technologies, and in particular, to a vehicle abnormality monitoring method, a vehicle lighting method, and an apparatus.

BACKGROUND

At present, there are more and more cases of vehicles being illegally scratched, collided and intruded. When a vehicle undergoes the foregoing illegal behavior, timely monitoring and video recording facilitate post-event tracing and accountability.

In a solution, abnormality detection devices such as a pressure sensor and/or an anti-theft sensor may be installed inside the vehicle. When the vehicle detects an abnormal event, a camera inside the vehicle can be started to record a video of the abnormal event. However, in this solution, because the camera inside the vehicle can perform monitoring only from the inside, an unauthorized person easily avoids or blocks a field of view of the camera, resulting in a poor monitoring effect. In another solution, a monitoring system based on a roadside device may perform continuous monitoring within a service range of the roadside device. If the vehicle is located within the service range of the roadside device, the roadside device may record a video in which the vehicle is illegally infringed. In this solution, the roadside device performs continuous monitoring, and records monitoring videos in all cases. Therefore, a process of searching all videos recorded by the roadside device for a video in which the vehicle is illegally infringed is relatively slow, and efficiency is low.

SUMMARY

Embodiments of this disclosure provide a vehicle abnormality monitoring method, a vehicle lighting method, and an apparatus, to effectively monitor an abnormal event of a vehicle.

According to a first aspect, a vehicle abnormality monitoring method is provided. The method is performed by a first vehicle or a component (for example, a chip, a chip system, or a processor) in the first vehicle. The method includes starting a monitoring device inside the first vehicle when an abnormal event is detected, where the monitoring device is configured to record a first video of the abnormal event after being started, determining a first roadside device in an area where the first vehicle is located, and sending a first monitoring request to the first roadside device, where the first monitoring request is used to request the first roadside device to record a second video of the abnormal event, and the first video and the second video are used to trace the abnormal event.

In the foregoing method, because a vehicle performs monitoring only based on a monitoring system of the vehicle, an unauthorized person easily avoids or blocks a field of view of a camera of the vehicle, resulting in a poor monitoring effect. In a procedure in FIG. 2, the vehicle performs monitoring in conjunction with a roadside device, to monitor the vehicle from the outside of the vehicle. This breaks the limitation of monitoring performed only by the vehicle, implements all-round intelligent monitoring, and improves a monitoring effect.

In a possible design, the first vehicle may first send a second monitoring request to a surrounding roadside device. The second monitoring request is used to request feedback information of a roadside device that is in the surrounding roadside device and that can monitor the abnormal event of the first vehicle, and the surrounding roadside device can determine whether the surrounding roadside device can monitor the abnormal event of the first vehicle. When one or more roadside devices in the surrounding roadside device determine that the one or more roadside devices in the surrounding roadside device can monitor the abnormal event of the first vehicle, the one or more roadside devices may send feedback information to the first vehicle. The feedback information may indicate that the one or more roadside monitoring devices can monitor the abnormal event of the first vehicle. After receiving the feedback information, the first vehicle may select, from the one or more roadside devices, one roadside device as the first roadside device.

In the foregoing method, there are one or more first roadside devices. If there is one first roadside device, the first vehicle may invite one roadside device to perform joint monitoring, or if there are a plurality of first roadside devices, the first vehicle may invite a plurality of roadside devices to perform joint monitoring, to further perform all-round monitoring and improve the monitoring effect.

In a possible design, the second monitoring request may carry location information of the first vehicle, and/or carry identification information indicating a communication type of the second monitoring request. The feedback information may carry identification information of the roadside device, and/or carry location information indicating the roadside device. The first monitoring request may carry identification information of the first roadside device, and/or carry identification information indicating a communication type of the first monitoring request.

In the foregoing method, a manner of sending the first monitoring request, the second monitoring request, and/or the feedback information is not limited. For example, a multicast mode, a unicast mode, or a broadcast mode may be included. Based on the information carried in the second monitoring request and the information carried in the feedback information, the first vehicle can determine a roadside device that can monitor the first vehicle, namely, the first roadside device. When the abnormal event occurs on the first vehicle, the first vehicle may directly send the first monitoring request to the first roadside device, to request the first roadside device to monitor the abnormal event of the first vehicle. This implements all-round monitoring and improves the monitoring effect.

In a possible design, the first vehicle may receive the second video from the first roadside device, and then report the second video and the first video recorded by the first vehicle to a cloud server.

In the foregoing method, the first vehicle may directly report the first video and the second video to the cloud server. Alternatively, the first vehicle may first send a reporting request to the cloud server, and then when the cloud server agrees to the reporting of the first vehicle, report the first video and the second video to the cloud server. The first vehicle may directly receive the second video from the first roadside device. Alternatively, the first vehicle receives the second video from the first roadside device after receiving a reporting request sent by the first roadside device and agreeing to the reporting of the first roadside device. The foregoing manner of directly reporting a video may improve video reporting efficiency and simplify a reporting procedure. In addition, the manner of sending a reporting request first and then reporting a video may improve security of the cloud server or the first vehicle, and prevent an unauthorized user from randomly reporting illegal content.

According to a second aspect, an embodiment of this disclosure further provides a vehicle abnormality monitoring method. For advantageous effects of the method, refer to the description in the first aspect. Details are not described herein again. The method is performed by a first roadside device or a component (for example, a chip, a chip system, or a processor) in the first roadside device. The method includes receiving a first monitoring request from a first vehicle, where the first monitoring request is used to request the first roadside device to record an abnormal event of the first vehicle, and recording the abnormal event of the first vehicle, to obtain a second video.

Optionally, the method further includes receiving a second monitoring request from the first vehicle, where the second monitoring request is used to request feedback information that is in a surrounding roadside device and that can monitor the abnormal event of the first vehicle, and when the first roadside device determines that the first roadside device can monitor the abnormal event of the first vehicle, sending feedback information to the first vehicle, where the feedback information indicates that the first roadside device can monitor the abnormal event of the first vehicle.

Optionally, the first monitoring request carries identification information of the first roadside device, and/or carries identification information indicating a communication type of the first monitoring request. The second monitoring request carries location information of the first vehicle, and/or carries identification information indicating a communication type of the second monitoring request. The feedback information carries identification information of the first roadside device, and/or carries location information of the first roadside device.

Optionally, the method further includes sending the second video to the first vehicle, or sending the second video to a cloud server.

According to a third aspect, an embodiment of this disclosure further provides a vehicle abnormality monitoring method. For advantageous effects of the method, refer to the description in the first aspect. Details are not described herein again. The method is performed by a cloud server or a component (for example, a chip, a chip system, or a processor) in the cloud server. The method includes receiving a first video and a second video from a first vehicle, where the first video is a video that is of an abnormal event of the first vehicle and that is recorded by the first vehicle, and the second video is a video that is of the abnormal event of the first vehicle and that is recorded by a first roadside device, and determining the abnormal event of the first vehicle based on the first video and the second video, or receiving a first video from a first vehicle, where the first video is a video that is of an abnormal event of the first vehicle and that is recorded by the first vehicle, receiving a second video from a first roadside device, where the second video is a video that is of the abnormal event of the first vehicle and that is recorded by the first roadside device, and determining the abnormal event of the first vehicle based on the first video and the second video.

According to a fourth aspect, an embodiment of this disclosure further provides a vehicle lighting method. The method is performed by a first vehicle or a component (for example, a chip, a chip system, or a processor) in the first vehicle. The method includes determining luminance of an ambient environment of a first vehicle when an abnormal event is detected, and sending a lighting request to a first roadside device when the luminance of the ambient environment of the first vehicle is less than or equal to a first threshold, where the lighting request is used to request the first roadside device to start a lighting system.

In the foregoing method, when the abnormal event is detected and luminance of a current environment is relatively low, the first vehicle may indicate the first roadside device to provide additional lighting, which improves a monitoring effect. In addition, there are one or more first roadside devices. When there is a plurality of first roadside devices, the plurality of roadside devices provides additional lighting for the ambient environment of the first vehicle, to further improve the monitoring effect.

Optionally, the lighting request may include location information of the first vehicle, and/or include indication information used to indicate a communication type of the lighting request.

In the foregoing method, the location information of the first vehicle may be three-dimensional information including longitude, latitude, a height, and the like of the first vehicle. Alternatively, the location information of the first vehicle may be two-dimensional information including longitude, latitude, and the like of the first vehicle. The identification information of the communication type of the lighting request may be a communication type 3 or the like.

According to a fifth aspect, an embodiment of this disclosure further provides a vehicle lighting method. For advantageous effects of this aspect, refer to the description in the fourth aspect. The method is performed by a first roadside device or a component (for example, a chip, a chip system, or a processor) in the first roadside device. The method includes receiving a lighting request from a first vehicle, where the lighting request is used to request the first roadside device to start a lighting system, and starting the lighting system.

Optionally, the lighting request carries location information of the first vehicle, and/or carries indication information indicating a communication type of the lighting request.

According to a sixth aspect, an embodiment of this disclosure provides an apparatus, to implement the method according to any one of the first aspect or the possible implementations of the first aspect. The apparatus includes a corresponding unit or component configured to perform the foregoing method. The unit included in the apparatus may be implemented in a software and/or hardware manner. The apparatus may be, for example, a user plane function network element, or a chip, a chip system, a processor, or the like that can support a user plane function network element in implementing the foregoing method.

According to a seventh aspect, an embodiment of this disclosure provides an apparatus, to implement the method according to any one of the second aspect or the possible implementations of the second aspect. The apparatus includes a corresponding unit or component configured to perform the foregoing method. The unit included in the apparatus may be implemented in a software and/or hardware manner. The apparatus may be, for example, a user plane function network element, or a chip, a chip system, a processor, or the like that can support a user plane function network element in implementing the foregoing method.

According to an eighth aspect, an embodiment of this disclosure provides an apparatus, to implement the method according to any one of the third aspect or the possible implementations of the third aspect. The apparatus includes a corresponding unit or component configured to perform the foregoing method. The unit included in the apparatus may be implemented in a software and/or hardware manner. The apparatus may be, for example, a user plane function network element, or a chip, a chip system, a processor, or the like that can support a user plane function network element in implementing the foregoing method.

According to a ninth aspect, an embodiment of this disclosure provides an apparatus, to implement the method according to any one of the fourth aspect or the possible implementations of the fourth aspect. The apparatus includes a corresponding unit or component configured to perform the foregoing method. The unit included in the apparatus may be implemented in a software and/or hardware manner. The apparatus may be, for example, a user plane function network element, or a chip, a chip system, a processor, or the like that can support a user plane function network element in implementing the foregoing method.

According to a tenth aspect, an embodiment of this disclosure provides an apparatus, to implement the method according to any one of the fifth aspect or the possible implementations of the fifth aspect. The apparatus includes a corresponding unit or component configured to perform the foregoing method. The unit included in the apparatus may be implemented in a software and/or hardware manner. The apparatus may be, for example, a user plane function network element, or a chip, a chip system, a processor, or the like that can support a user plane function network element in implementing the foregoing method.

According to an eleventh aspect, an embodiment of this disclosure provides an apparatus, including a processor. The processor is coupled to a memory, the memory is configured to store a program or instructions, and when the program or the instructions are executed by the processor, the apparatus is enabled to implement the method according to any one of the first aspect or the possible implementations of the first aspect.

According to a twelfth aspect, an embodiment of this disclosure provides an apparatus, including a processor. The processor is coupled to a memory, the memory is configured to store a program or instructions, and when the program or the instructions are executed by the processor, the apparatus is enabled to implement the method according to any one of the second aspect or the possible implementations of the second aspect.

According to a thirteenth aspect, an embodiment of this disclosure provides an apparatus, including a processor. The processor is coupled to a memory, the memory is configured to store a program or instructions, and when the program or the instructions are executed by the processor, the apparatus is enabled to implement the method according to any one of the third aspect or the possible implementations of the third aspect.

According to a fourteenth aspect, an embodiment of this disclosure provides an apparatus, including a processor. The processor is coupled to a memory, the memory is configured to store a program or instructions, and when the program or the instructions are executed by the processor, the apparatus is enabled to implement the method according to any one of the fourth aspect or the possible implementations of the fourth aspect.

According to a fifteenth aspect, an embodiment of this disclosure provides an apparatus, including a processor. The processor is coupled to a memory, the memory is configured to store a program or instructions, and when the program or the instructions are executed by the processor, the apparatus is enabled to implement the method according to any one of the fifth aspect or the possible implementations of the fifth aspect.

According to a sixteenth aspect, an embodiment of this disclosure provides a computer-readable storage medium. The computer-readable storage medium stores a computer program or instructions, and when the computer program or the instructions are executed, a computer is enabled to perform the method according to any one of the first aspect or the possible implementations of the first aspect.

According to a seventeenth aspect, an embodiment of this disclosure provides a computer-readable storage medium. The computer-readable storage medium stores a computer program or instructions, and when the computer program or the instructions are executed, a computer is enabled to perform the method according to any one of the second aspect or the possible implementations of the second aspect.

According to an eighteenth aspect, an embodiment of this disclosure provides a computer-readable storage medium. The computer-readable storage medium stores a computer program or instructions, and when the computer program or the instructions are executed, a computer is enabled to perform the method according to any one of the third aspect or the possible implementations of the third aspect.

According to a nineteenth aspect, an embodiment of this disclosure provides a computer-readable storage medium. The computer-readable storage medium stores a computer program or instructions, and when the computer program or the instructions are executed, a computer is enabled to perform the method according to any one of the fourth aspect or the possible implementations of the fourth aspect.

According to a twentieth aspect, an embodiment of this disclosure provides a computer-readable storage medium. The computer-readable storage medium stores a computer program or instructions, and when the computer program or the instructions are executed, a computer is enabled to perform the method according to any one of the fifth aspect or the possible implementations of the fifth aspect.

According to a twenty-first aspect, an embodiment of this disclosure provides a computer program product. The computer program product includes computer program code, and when the computer program code is run on a computer, the computer is enabled to perform the method according to any one of the first aspect or the possible implementations of the first aspect.

According to a twenty-second aspect, an embodiment of this disclosure provides a computer program product. The computer program product includes computer program code, and when the computer program code is run on a computer, the computer is enabled to perform the method according to any one of the second aspect or the possible implementations of the second aspect.

According to a twenty-third aspect, an embodiment of this disclosure provides a computer program product. The computer program product includes computer program code, and when the computer program code is run on a computer, the computer is enabled to perform the method according to any one of the third aspect or the possible implementations of the third aspect.

According to a twenty-fourth aspect, an embodiment of this disclosure provides a computer program product. The computer program product includes computer program code, and when the computer program code is run on a computer, the computer is enabled to perform the method according to any one of the fourth aspect or the possible implementations of the fourth aspect.

According to a twenty-fifth aspect, an embodiment of this disclosure provides a computer program product. The computer program product includes computer program code, and when the computer program code is run on a computer, the computer is enabled to perform the method according to any one of the fifth aspect or the possible implementations of the fifth aspect.

According to a twenty-sixth aspect, an embodiment of this disclosure provides a chip, including a processor. The processor is coupled to a memory, the memory is configured to store a program or instructions, and when the program or the instructions are executed by the processor, the chip is enabled to implement the method according to any one of the first aspect or the possible implementations of the first aspect.

According to a twenty-seventh aspect, an embodiment of this disclosure provides a chip, including a processor. The processor is coupled to a memory, the memory is configured to store a program or instructions, and when the program or the instructions are executed by the processor, the chip is enabled to implement the method according to any one of the second aspect or the possible implementations of the second aspect.

According to a twenty-eighth aspect, an embodiment of this disclosure provides a chip, including a processor. The processor is coupled to a memory, the memory is configured to store a program or instructions, and when the program or the instructions are executed by the processor, the chip is enabled to implement the method according to any one of the third aspect or the possible implementations of the third aspect.

According to a twenty-ninth aspect, an embodiment of this disclosure provides a chip, including a processor. The processor is coupled to a memory, the memory is configured to store a program or instructions, and when the program or the instructions are executed by the processor, the chip is enabled to implement the method according to any one of the fourth aspect or the possible implementations of the fourth aspect.

According to a thirtieth aspect, an embodiment of this disclosure provides a chip, including a processor. The processor is coupled to a memory, the memory is configured to store a program or instructions, and when the program or the instructions are executed by the processor, the chip is enabled to implement the method according to any one of the fifth aspect or the possible implementations of the fifth aspect.

DESCRIPTION OF EMBODIMENTS

Figure 1:
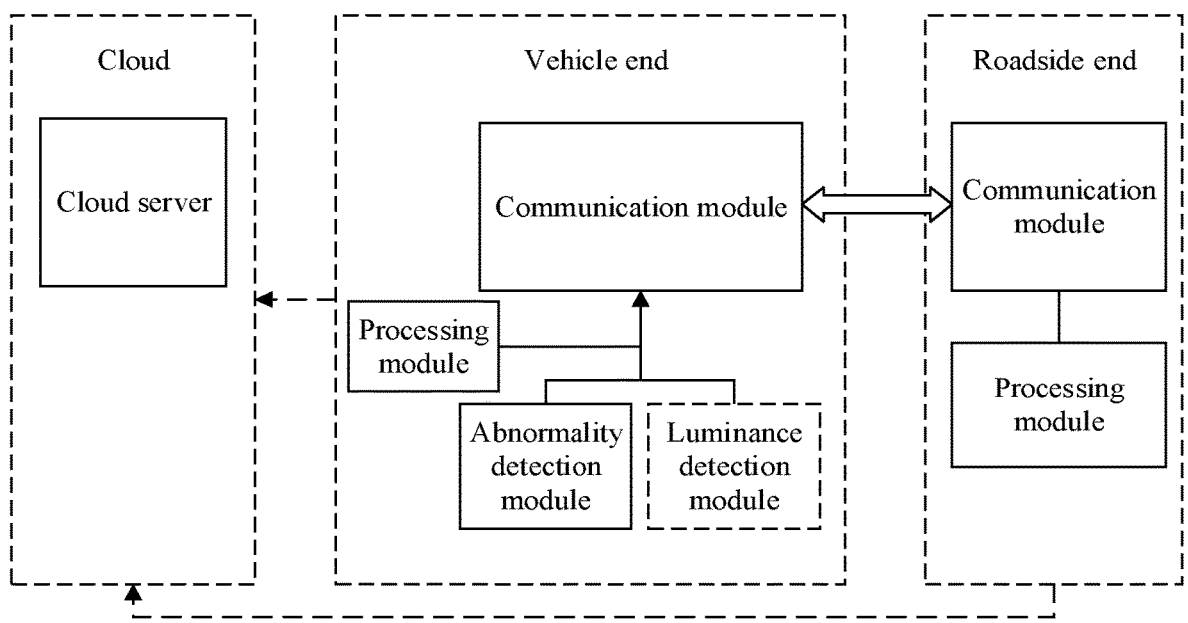
FIG. 1 is a schematic diagram of a communication system according to an embodiment of this disclosure.

A vehicle abnormality monitoring method, a vehicle lighting method, and an apparatus provided in embodiments of this disclosure may be applied to a communication system. As shown in FIG. 1, a communication system is provided, including a vehicle end, a roadside end, and a cloud.

The vehicle end may include one or more vehicles, for example, a first vehicle in the following embodiments. A vehicle at the vehicle end may include a processing module, an abnormality detection module, a communication module, and the like. The abnormality detection module is configured to detect abnormalities such as a collision, scratch, and illegal intrusion of vehicles. When the abnormality detection module detects the foregoing abnormalities, the processing module may activate the communication module. The communication module may be configured to communicate with the outside (for example, a roadside device or a cloud server). The abnormality detection module may be implemented by a pressure sensor, an anti-theft sensor, or the like. This is not limited.

Optionally, the vehicle of the vehicle may further include an ambient luminance detection module configured to detect luminance of an ambient environment of the vehicle. When an abnormality occurs on the vehicle and luminance of an ambient environment is less than a preset threshold, the communication module of the vehicle may send a lighting request to a surrounding roadside device. After receiving the lighting request, the roadside device may start a lighting device. The luminance detection module may be implemented by a light sensor or the like. This is not limited.

The roadside end may include one or more roadside devices. The roadside device may include a processing module, a communication module, and the like. The communication module is configured to receive a monitoring request, a lighting request, and/or the like that are/is sent by a vehicle. The processing module is configured to monitor the vehicle according to the monitoring request, or assist in lighting of an ambient environment according to the lighting request, or the like.

The cloud may include a cloud server and the like, and is configured to process a video of an abnormality monitored by a vehicle and/or a video of an abnormality monitored by a roadside device. In a possible implementation, the vehicle and the roadside device may separately upload the video of the abnormality to the cloud server. That is, the vehicle and the roadside device separately upload the video of the abnormality recorded by themselves. Alternatively, the roadside device may upload the video of the abnormality recorded by the roadside device to the vehicle. The vehicle uploads the video of the abnormality recorded by the vehicle and the video of the abnormality recorded by the roadside device to the cloud server. It should be noted that the vehicle or the roadside device may upload, to the cloud server, a monitoring image (which may also be referred to as a monitoring picture), license plate information, or the like, in addition to the foregoing monitoring video. This is not limited.

It should be noted that in embodiments of this disclosure, the terms such as "first" and "second" are merely used for the purpose of distinction in description, and cannot be understood as indicating or implying relative importance, or as indicating or implying a sequence. "At least one" means one or more, and "a plurality of" means two or more. The term "and/or" describes an association relationship between associated objects and represents that three relationships may exist. For example, A and/or B may represent the following three cases: only A exists, both A and B exist, and only B exists. A and B may be in a singular or plural form. The character "/" generally represents an "or" relationship between the associated objects. "At least one item (piece) of the following" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

Based on the foregoing communication system, an embodiment of this disclosure provides a vehicle abnormality detection method. A principle of the method is as follows. When a vehicle detects that an abnormal event such as intrusion, scratch, or a collision occurs on the vehicle, the vehicle indicates a roadside device to perform joint monitoring. Compared with a manner of monitoring performed only by the vehicle, this can break the limitation of monitoring performed only by the vehicle, and implement all-round intelligent monitoring.

The technologies described in embodiments of this disclosure may be applied to various communication systems, for example, a 4th generation (4G) communication system, a 4.5G communication system, a fifth generation (5G) communication system, a system integrating a plurality of communication systems, or a future evolved communication system (for example, a sixth generation (6G) communication system), for example, a Long-Term Evolution (LTE) system, a New Radio (NR) system, an Internet of things (IoT) system, an Internet of vehicles system, a WI-FI system, a communication system related to the 3rd Generation Partnership Project (3GPP), and another communication system of this type.

Figure 2:
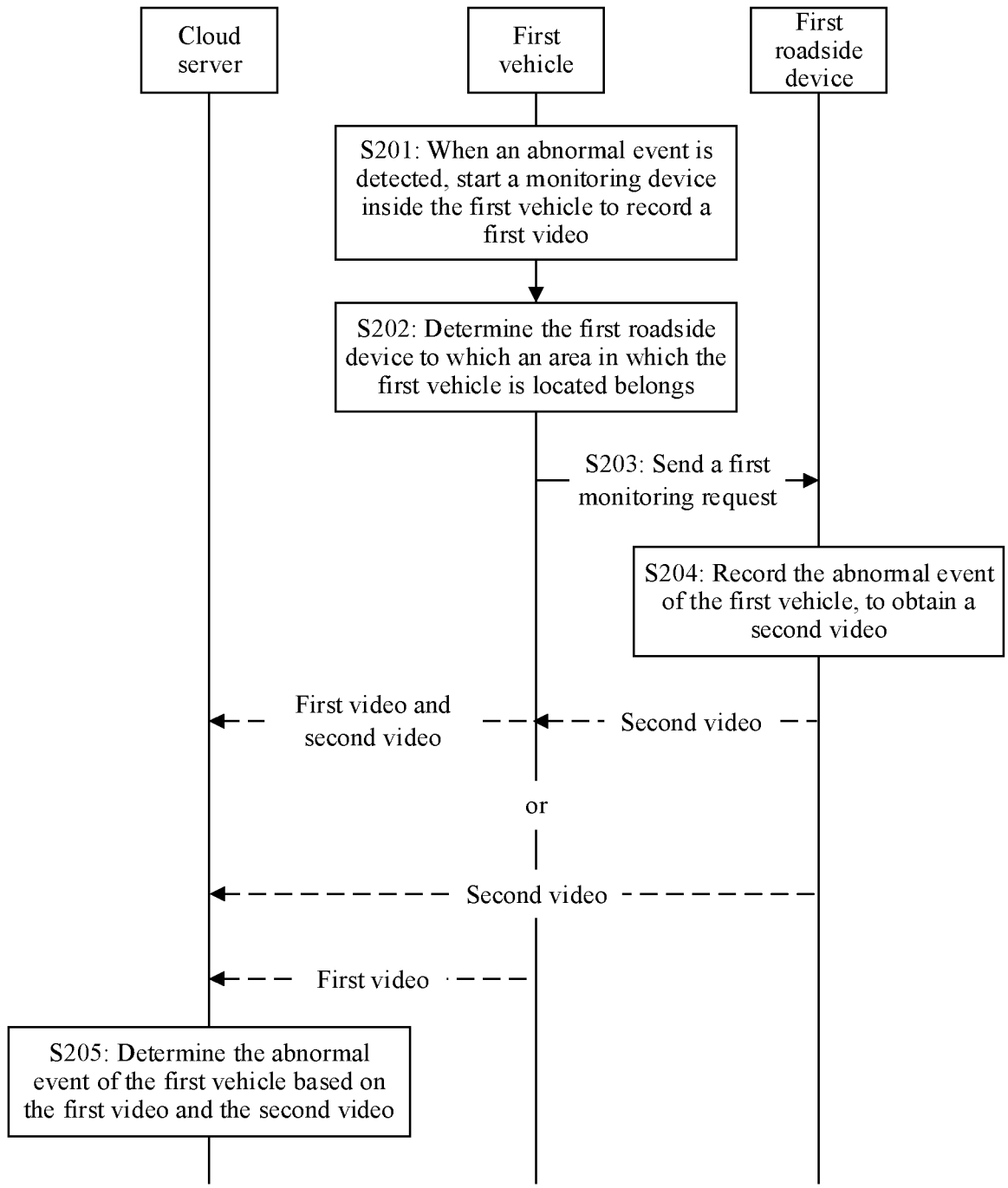
FIG. 2 is a flowchart of a vehicle abnormality monitoring method according to an embodiment of this disclosure.

As shown in FIG. 2, a vehicle abnormality monitoring method is provided. In the method, a vehicle may perform monitoring in combination with a roadside device, to implement all-round intelligent monitoring. The method is performed by a first vehicle, a second vehicle, the roadside device, and a cloud server. It may be understood that the first vehicle may alternatively be a component (for example, a chip, a chip system, or a processor) in the first vehicle, the second vehicle may alternatively be a component (for example, a chip, a chip system, or a processor) in the second vehicle, the roadside device may alternatively be a component (for example, a chip, a chip system, or a processor) in the roadside device, and the cloud server may alternatively be a component (for example, a chip, a chip system, or a processor) in the cloud server. The procedure includes the following steps.

S201: The first vehicle starts a monitoring device inside the first vehicle when an abnormal event is detected, where the monitoring device is configured to record a first video of the abnormal event after being started.

Optionally, the abnormal event may include a collision, illegal scratch, illegal intrusion, or the like. In a possible implementation, an anti-theft sensor may be installed on the first vehicle. When the anti-theft sensor detects an abnormality or generates an alarm, the first vehicle may consider that the abnormal event currently occurs. In another possible implementation, a pressure sensor may be installed on the first vehicle. When a pressure detected by the pressure sensor is greater than or equal to a specified threshold, the first vehicle may consider that the abnormal event currently occurs on the first vehicle. The monitoring device inside the first vehicle may include, for example, a camera installed inside the first vehicle.

S202: The first vehicle determines a first roadside device in an area where the first vehicle is located, where there are one or more first roadside devices. If there is one first roadside device, the first vehicle may invite one roadside device to perform joint monitoring. If there are a plurality of first roadside devices, the first vehicle may invite a plurality of roadside devices to perform joint monitoring, to further perform all-round monitoring and improve a monitoring effect.

In a possible implementation, the first vehicle may first send a second monitoring request to a surrounding roadside device. The second monitoring request is used to request feedback information of a roadside device that is in the surrounding roadside device and that can monitor the abnormal event of the first vehicle. The surrounding roadside device can determine whether the surrounding roadside device can monitor the abnormal event of the first vehicle. When one or more roadside devices in the surrounding roadside device determine that the one or more roadside devices in the surrounding roadside device can monitor the abnormal event of the first vehicle, the one or more roadside devices may send feedback information to the first vehicle. The feedback information may indicate that the one or more roadside monitoring devices can monitor the abnormal event of the first vehicle. After receiving the feedback information, the first vehicle may select one roadside device from the one or more roadside devices. In this embodiment of this disclosure, it is assumed that the roadside device selected by the first vehicle is the first roadside device. Then, the first vehicle performs the following S203. The first vehicle sends a first monitoring request to the first roadside device. After receiving the first monitoring request, the first roadside device starts a monitoring device inside the first roadside device, to record the abnormal event of the first vehicle.

Optionally, the second monitoring request may carry location information of the first vehicle, and/or carry identification information indicating a communication type of the second monitoring request. For example, the location information of the first vehicle may be three-dimensional, including information such as longitude, latitude, and a height of a current location of the first vehicle. Alternatively, the location of the first vehicle may be two-dimensional, including only information such as the longitude and the latitude of the current location of the first vehicle. This is not limited. An identifier of the communication type of the second monitoring request may be a communication type 1 or the like. In a possible implementation, after receiving the second monitoring request, the surrounding roadside device of the first vehicle may determine, based on the location information of the first vehicle carried in the second monitoring request, whether the first vehicle is within a service range of the roadside devices. If the first vehicle is within the service range of the roadside devices, the roadside devices may send the feedback information to the first vehicle. The feedback information may carry identification information of the roadside device, and/or carry location information indicating the roadside device. For example, the identification information of the roadside device may be identification or the like of the roadside device, and the location information of the roadside device may be three-dimensional, two-dimensional, or the like. This is not limited. Then, the first vehicle may determine the first roadside device from the roadside devices that send the feedback information. It may be understood that if there is only one roadside device that sends the feedback information, the roadside device that sends the feedback information is the first roadside device. If there are a plurality of roadside devices that send the feedback information, the first vehicle may select, from the plurality of roadside devices, one roadside device as the first roadside device. For example, the first vehicle may randomly select, from the plurality of roadside devices, one roadside device as the first roadside device. Alternatively, the first vehicle may select, from the plurality of roadside devices, a roadside device that meets a condition as the first roadside device. Because the feedback information carries the location information of the roadside device, in a possible implementation, the first vehicle may select, based on the location information of the roadside device, a roadside device closest to the first vehicle as the first roadside device. It can be learned from the foregoing description that, then, the first vehicle may perform the following step S203. The first vehicle sends the first monitoring request to the first roadside device. The first monitoring request may carry identification information of the first roadside device, and/or carry identification information indicating a communication type of the first monitoring request. Similarly, the identification information of the first roadside device may be identification (ID) of the first roadside device, and the identification information indicating the communication type of the first monitoring request may be a communication type 2 or the like. This is not limited.

In this embodiment of this disclosure, at least one of the first monitoring request, the second monitoring request, or the feedback information may be sent in a multicast mode, a broadcast mode, a unicast mode, or the like. This is not limited.

It should be noted that in the foregoing description, an example in which there is one first roadside device is used for description. When there is the plurality of first roadside devices, a process in which the first vehicle selects the plurality of roadside devices as the first roadside devices is similar to the foregoing process. For example, the first vehicle may select a plurality of roadside devices closest to the first vehicle as the first roadside devices. Details are not described again.

S203: The first vehicle sends the first monitoring request to the first roadside device, where the first monitoring request is used to request the first roadside device to record a second video of the abnormal event, and the first video and the second video are used to trace the abnormal event. Correspondingly, the first roadside device receives the first monitoring request sent by the first vehicle.

S204: The first roadside device records the abnormal event of the first vehicle, to obtain the second video.

S205: The cloud server recognizes a license plate number, a person, and the like in the first video and the second video, and analyzes the abnormal event that occurs, an abnormal vehicle, and a person feature, to determine the abnormal event of the first vehicle.

In a possible implementation, the first roadside device may send the second video to the first vehicle, and then the first vehicle sends, to the cloud server, the first video recorded by the first vehicle and the second video recorded by the first roadside device. For example, the first roadside device may send an upload request to the first vehicle. After the first vehicle allows the upload request, the first roadside device sends the second video to the first vehicle. The first vehicle verifies the second video. After the verification succeeds, the first vehicle sorts and obtains the second video and the first video. The first vehicle sends the upload request to the cloud server. After the cloud server allows the upload request, the first vehicle uploads the first video and the second video to the cloud server.

Alternatively, in another possible implementation, the first roadside device directly sends the second video to the cloud server, and the first vehicle sends the first video to the cloud server. For example, the first roadside device sends the upload request to the cloud server. After the cloud server allows the upload request, the first roadside device sends the second video to the cloud server. The first vehicle sends the upload request to the cloud server. After the cloud server allows the upload request, the first vehicle sends the first video to the cloud server.

In the foregoing method, because a vehicle performs monitoring only based on a monitoring system of the vehicle, an unauthorized person easily avoids or blocks a field of view of a camera of the vehicle, resulting in a poor monitoring effect. In the procedure in FIG. 2, the vehicle performs monitoring in conjunction with a roadside device, to monitor the vehicle from the outside of the vehicle. This breaks the limitation of monitoring performed only by the vehicle, implements all-round intelligent monitoring, and improves the monitoring effect.

It should be noted that the foregoing procedure in FIG. 2 is described by using an example in which the first vehicle and the first roadside device respectively report the first video and the second video to the cloud server, and is not intended to limit this embodiment of this disclosure. For example, the first vehicle and the first roadside device may further report monitoring images, license plate information, or the like to the cloud server, and a processing procedure is similar to the foregoing process. For example, if the first vehicle and the first roadside device report monitoring images to the cloud server, the first video and the second video are respectively replaced with a monitoring image taken by the first vehicle and a monitoring image taken by the first roadside device. Further, in this embodiment of this disclosure, types of information reported by the first vehicle and the first roadside device to the cloud server are the same or different. For example, the types of information reported by the first vehicle and the first roadside device to the cloud server may be the same. For example, the types of information may be a video, a monitoring image, license plate information, or the like. Alternatively, the types of information reported by the first vehicle and the first roadside device to the cloud server may be different. For example, the first vehicle may report a video to the cloud server, and the first roadside device may report a monitoring image to the cloud server.

Figure 3:
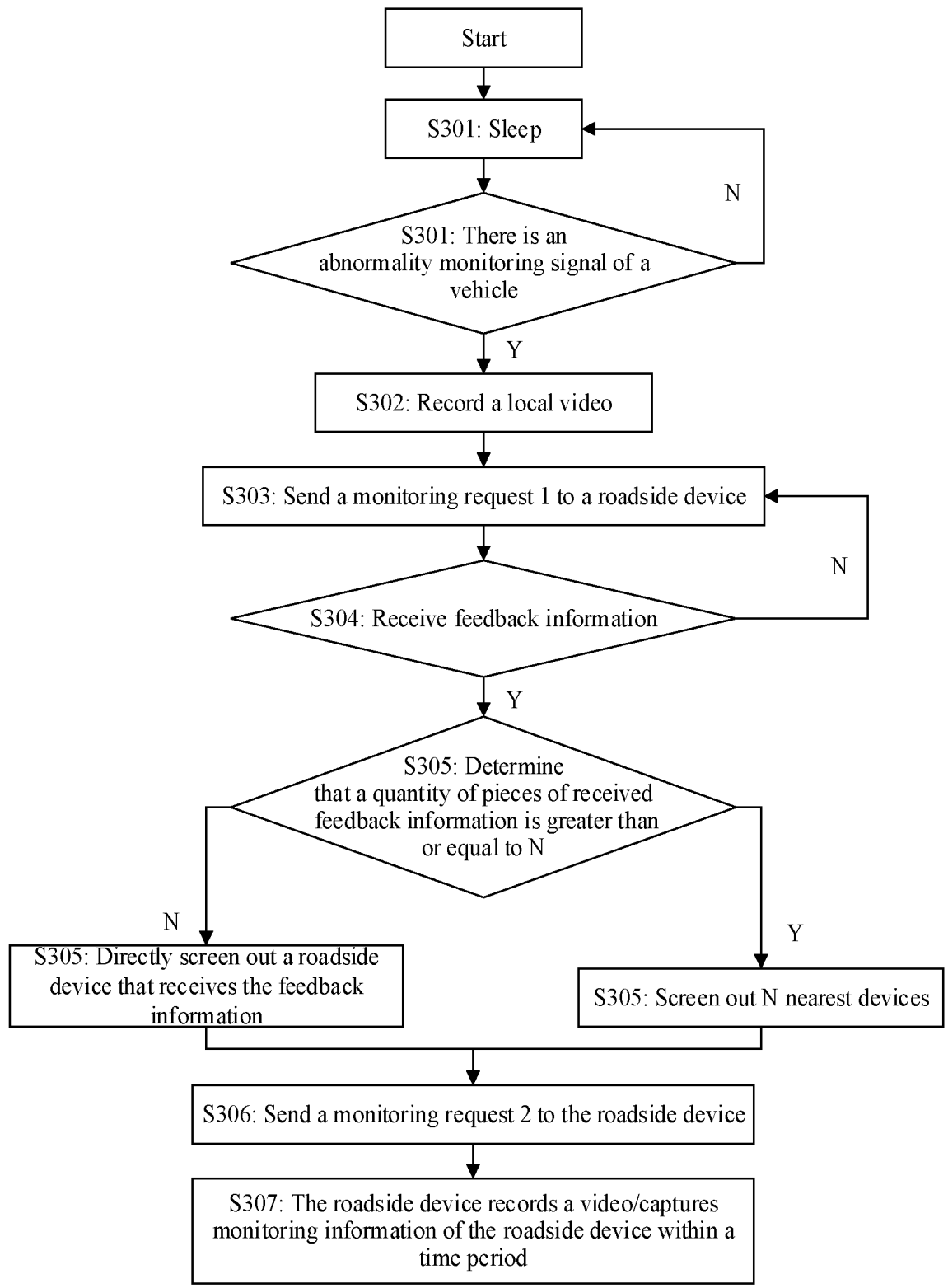
FIG. 3 is another flowchart of a vehicle abnormality monitoring method according to an embodiment of this disclosure.

For example, the process in FIG. 2 is described in detail by using an example in which the first vehicle includes an abnormality detection module, a communication module, and a processing module. For ease of description, as shown in FIG. 3, a procedure is provided. The procedure includes the following steps.

S301: The first vehicle is in a sleep state, and determines, at an interval of a preset time, whether the abnormality detection module detects the abnormal event. If the abnormality detection module detects the abnormal event, S302 is performed to activate the vehicle to enter an abnormal state. Otherwise, the first vehicle continues to sleep for a protection purpose. It may be understood that the term "sleep" in this embodiment of this disclosure may mean that the communication module and the processing module of the first vehicle are in a sleep state, but the abnormality detection module is not in a sleep state, and in this case, the abnormality detection module needs to detect, in real time, whether the abnormal event occurs.

S302: The processing module controls the monitoring system to record a local video. For example, the processing module may indicate the camera of the vehicle to record the local video.

S303: The processing module activates the processing module, and sends a monitoring request 1 to roadside devices, where the monitoring request 1 is the second monitoring request in the procedure in FIG. 2, and the monitoring request 1 may carry the communication type 1 and the location information of the first vehicle. After receiving the monitoring request 1, the roadside devices may send the feedback information to the first vehicle. The feedback information carries ID information of the roadside device, location information of the roadside devices, and the like. Correspondingly, the first vehicle performs S304.

S304: The communication module of the first vehicle receives the feedback information.

S305: The processing module of the first vehicle may screen out the roadside devices based on the received feedback information. In a possible implementation, the processing module of the first vehicle may determine whether a quantity of pieces of received feedback information is greater than or equal to N, where N is an integer greater than or equal to 1. If the quantity of pieces of feedback information received by the communication module of the first vehicle is greater than or equal to N, the processing module of the first vehicle may screen out N roadside devices from the roadside devices that receive the feedback information. For example, the processing module may select, from the roadside devices that receive the feedback information, N roadside devices that are relatively close to the processing module. If the quantity of pieces of feedback information received by the communication module of the first vehicle is less than N, the processing module of the first vehicle may directly screen out the roadside devices that receive the feedback information. In the following S306, the communication module is controlled to directly send a monitoring request 2 to the screened roadside devices.

S306: The communication module of the first vehicle sends the monitoring request 2 to the screened roadside devices, where the monitoring request 2 is the first monitoring request in the procedure shown in FIG. 2, and the monitoring request 2 may carry the communication type 2, ID of the roadside devices, and the like.

S307: The roadside devices receive the monitoring request 2, and a roadside device of corresponding ID monitors the first vehicle. In this embodiment of this disclosure, when receiving the monitoring request 2, the roadside devices may immediately monitor the first vehicle and record videos of the first vehicle. Alternatively, when receiving the monitoring request 2, the roadside devices may capture videos within a preset time period. In this manner, it is mainly considered that when the abnormal event occurs instantaneously (for example, a running vehicle illegally scrapes the first vehicle), if the roadside devices monitor the first vehicle when receiving the monitoring request 2, the abnormal event may have stopped. Certainly, in the manner in which the roadside devices capture the videos in the preset time period, it further needs to be ensured that the first vehicle is located in monitoring ranges of the roadside devices.

Compared with the existing solution, the solution of this disclosure has the following improvements. A communication module is added to a vehicle end and a roadside end. A vehicle end communication module sends the vehicle monitoring request 1, and a roadside communication module receives the monitoring request 1 and feeds back roadside ID and location information. However, when the vehicle detects an abnormality, the vehicle end sends the monitoring request 2 to a roadside device, to indicate the roadside device to perform joint monitoring. This resolves a problem that an unauthorized person avoids or blocks a camera when monitoring is performed only by the vehicle, and the roadside device performs monitoring from the outside of the vehicle. Compared with a solution in which monitoring is performed only by using a roadside camera, the solution of this disclosure can reduce redundancy of roadside monitoring information, obtain abnormality monitoring information of a vehicle, and implement label-based intelligent monitoring.

Figure 4:
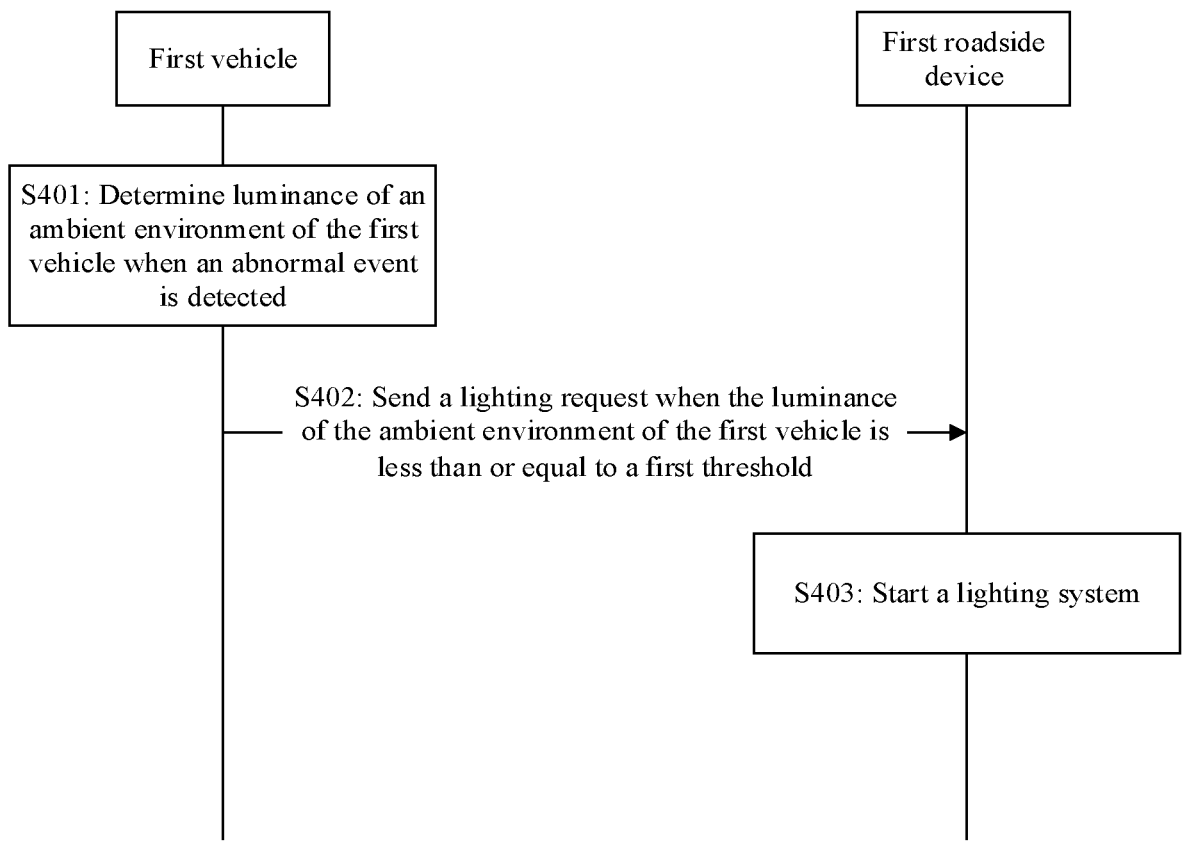
FIG. 4 is a flowchart of a lighting method according to an embodiment of this disclosure.

As shown in FIG. 4, a vehicle lighting method is provided. The method is performed by a first vehicle and a first roadside device. It may be understood that the first vehicle may be a component (for example, a chip, a chip system, or a processor) in the first vehicle, and the first roadside device may be a component (for example, a chip, a chip system, or a processor) in the first roadside device. The procedure includes the following steps.

S401: The first vehicle determines luminance of an ambient environment of the first vehicle when an abnormal event is detected. For how the first vehicle detects the abnormal event, refer to the description of the procedure shown in FIG. 2. Details are not described herein again. The first vehicle may include a luminance detection module, and the luminance detection module can detect the luminance of the ambient environment of the first vehicle.

S402: The first vehicle sends a lighting request to the first roadside device when the luminance of the ambient environment of the first vehicle is less than or equal to a first threshold, where the lighting request is used to request the first roadside device to start a lighting system. Correspondingly, the first roadside device receives the lighting request from the first vehicle. The lighting request may include location information of the first vehicle, and/or include indication information used to indicate a communication type of the lighting request. Optionally, the location information of the first vehicle may be three-dimensional information including longitude, latitude, a height, and the like of the first vehicle. Alternatively, the location information of the first vehicle may be two-dimensional information including longitude, latitude, and the like of the first vehicle. The identification information of the communication type of the lighting request may be a communication type 3 or the like. When the luminance of the ambient environment of the first vehicle is greater than the first threshold, it indicates that the luminance of the ambient environment of the first vehicle is adequate, no additional lighting is needed from the first roadside device, and the procedure is directly ended. Further, the first threshold may be preconfigured when the first vehicle is delivered from a factory, or the first threshold may be configured by a user for the first vehicle, or the first threshold may be configured by a cloud server or a roadside device for the first vehicle, or the like. This is not limited.

S403: The first roadside device starts the lighting system.

The vehicle lighting method in the procedure shown in FIG. 4 and the vehicle abnormality monitoring method in the procedure shown in FIG. 2 may be used in combination, or may be used separately. When the two methods are used in combination and the abnormal event is detected, the first vehicle may indicate the first roadside device to perform joint monitoring and supplement a photo. When the two methods are separately used, in the procedure shown in FIG. 4, for a process in which the first vehicle determines the first roadside device, refer to the description in the procedure shown in FIG. 2. Details are not described herein again. In addition, it should be additionally noted that in the procedure shown in FIG. 4, there may be one or more first roadside devices. When there is one first roadside device, the first vehicle may indicate the one roadside device to provide additional lighting for the ambient environment. When there is a plurality of first roadside devices, the first vehicle may indicate the plurality of roadside devices to provide additional lighting for the ambient environment. This further improves a lighting effect.

Figure 5:
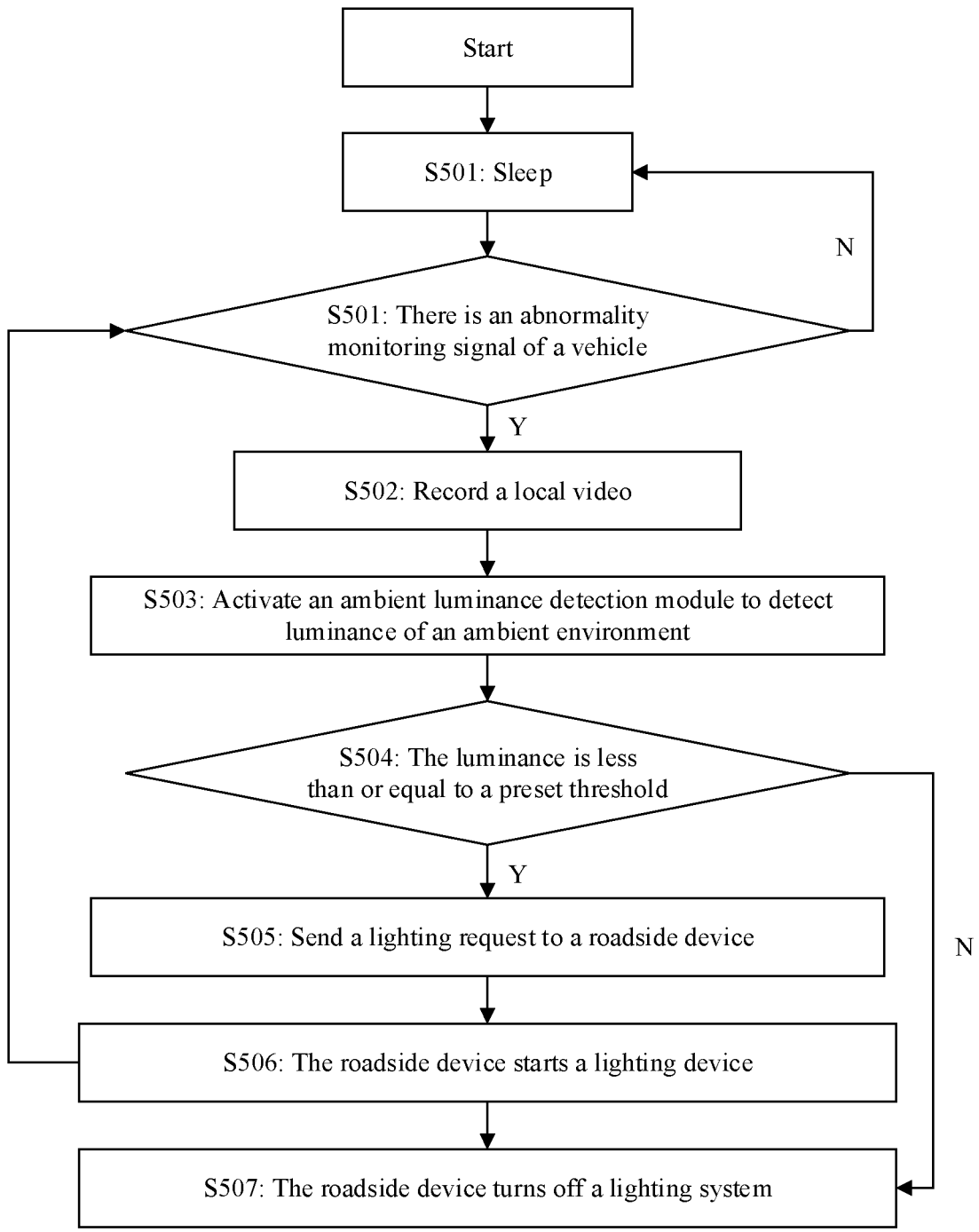
FIG. 5 is another flowchart of a lighting method according to an embodiment of this disclosure.

For example, the foregoing combination is described by using an example in which the procedures shown in FIG. 3 and FIG. 2 are used in combination, and the first vehicle includes an abnormality detection module, the luminance detection module, a communication module, and a processing module. For ease of description, as shown in FIG. 5, a procedure is provided. The procedure includes the following steps.

S501: The first vehicle is in a sleep state, and determines, at an interval of a preset time, whether the abnormality detection module detects an abnormality monitoring signal. If the abnormality detection module detects the abnormality monitoring signal, S502 is performed to activate the vehicle to enter an abnormal state. Otherwise, the first vehicle continues to sleep for a protection purpose.

S502: The processing module of the first vehicle controls the monitoring system to record a local video. For example, the processing module may indicate a camera of the vehicle to record the local video.

S503: The processing module of the first vehicle activates the luminance detection module to detect the luminance of the ambient environment.

S504: The processing module of the first vehicle determines whether the luminance of the ambient environment is less than or equal to the preset threshold. If the luminance of the ambient environment is less than or equal to the preset threshold, perform S505. If the luminance of the ambient environment is more than the preset threshold, perform S507.

S505: The first vehicle activates the communication module to send the lighting request to the roadside device, where the lighting request includes the communication type 3 and the location information of the first vehicle.

S506: The roadside device starts the lighting system when receiving the lighting request. It should be noted that, to save energy, after starting the lighting system, the roadside device needs to periodically obtain whether the abnormality monitoring signal can still be detected currently by the first vehicle. For example, after starting the lighting system, the roadside device may request the first vehicle to report whether the abnormality monitoring information can be detected currently. Alternatively, after sending the lighting request to the roadside device, the first vehicle may actively and periodically report, to the roadside device, indication information used to indicate whether the abnormality monitoring information can be detected currently, or the like. This is not limited. If the abnormality monitoring information can be detected currently, it indicates that the first vehicle is still being illegally infringed currently, and lighting continues to be provided. If the abnormality monitoring information cannot be detected currently, it indicates that the first vehicle is currently in a normal state and is not illegally infringed, and step S507 is performed to turn off the lighting system.

S507: The roadside device turns off the lighting system.

According to the foregoing method, when the abnormal event occurs on the first vehicle, and the luminance of the ambient environment of a vehicle body is lower than the preset threshold, the lighting request may be sent to the roadside device, to indicate the roadside device to start the lighting system, so that a problem of a poor monitoring effect caused by inadequate luminance during nighttime monitoring is resolved, and high-quality monitoring is implemented. Further, this facilitates tracing of an illegal invasion suffered by the first vehicle.

In the method provided in this embodiment of this disclosure, the method provided in this embodiment of this disclosure is separately described from a perspective of interaction between the first vehicle, the first roadside device, and the cloud server. To implement the functions in the method provided in this embodiment of this disclosure, the first vehicle, the first roadside device, and the cloud server each may include a hardware structure and/or a software unit, and implement the foregoing functions in a form of the hardware structure, the software unit, or a combination of the hardware structure and the software unit. Whether one of the foregoing functions is performed by using the hardware structure, the software unit, or the combination of the hardware structure and the software unit depends on a particular application and a design constraint condition of the technical solution.

The methods provided in embodiments of this disclosure are described above in detail with reference to FIG. 1 to FIG. 5. The apparatus provided in embodiments of this disclosure is described in detail below with reference to FIG. 6 and FIG. 7. It should be understood that descriptions of the apparatus embodiments correspond to descriptions of the method embodiments. Therefore, for content that is not described in detail, refer to the descriptions in the foregoing method embodiments.

Figure 6:
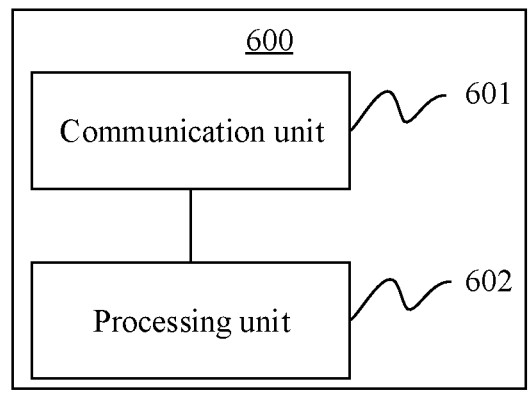
FIG. 6 is a schematic diagram of a structure of an apparatus according to an embodiment of this disclosure.

FIG. 6 is a schematic block diagram of an apparatus 600 according to an embodiment of this disclosure. The apparatus 600 is configured to implement functions of the first vehicle, the first roadside device, or the cloud server in the foregoing methods. For example, the apparatus may be a software unit or a chip system. The chip system may include a chip, or may include a chip and another discrete device. The apparatus includes a communication unit 601, and may further include a processing unit 602. The communication unit 601 may communicate with the outside. For example, the communication unit may send a first monitoring request. The processing unit 602 is configured to perform processing. For example, the processing unit determines a first roadside device in an area where the first vehicle is located, or starts a monitoring device inside the first vehicle. The communication unit 601 may also be referred to as a communication interface, a transceiver unit, an input/output interface, or the like. For example, the communication unit 601 may include a sending unit, a receiving unit, and/or the like. The sending unit and the receiving unit are respectively configured to perform the sending step or the receiving step in the procedure shown in FIG. 2 or FIG. 4.

In an example, the apparatus 600 can implement the steps performed by the first vehicle in the procedure shown in FIG. 2, and the apparatus 600 may be the first vehicle, or a chip or a circuit configured in the first vehicle. The communication unit 601 performs receiving and sending operations of the first vehicle in the procedure shown in FIG. 2.

The processing unit 602 is configured to perform a processing-related operation in the procedure shown in FIG. 2.

For example, the processing unit 602 is configured to start the monitoring device inside the first vehicle when an abnormal event is detected, where the monitoring device is configured to record a first video of the abnormal event after being started. The processing unit 602 is further configured to determine the first roadside device in an area where the first vehicle is located. The communication unit 601 is configured to send the first monitoring request to the first roadside device, where the first monitoring request is used to request the first roadside device to record a second video of the abnormal event, and the first video and the second video are used to trace the abnormal event.

Optionally, the processing unit 602 is configured to determine the first roadside device in an area where the processing unit 602 is located, and control the communication unit 601 to send a second monitoring request to a surrounding roadside device, where the second monitoring request is used to request feedback information of a roadside device that is in the surrounding roadside device and that can monitor the abnormal event of the first vehicle. The communication unit 601 receives feedback information sent by one or more roadside devices including the first roadside device, where the feedback information indicates that the one or more roadside devices can monitor the abnormal event of the first vehicle, and determines the first roadside device from the one or more roadside devices.

Optionally, the first monitoring request carries identification information of the first roadside device, and/or carries identification information indicating a communication type of the first monitoring request. The second monitoring request carries location information of the first vehicle, and/or carries identification information indicating a communication type of the second monitoring request. The feedback information carries identification information of a corresponding roadside device, and/or carries location information of the corresponding roadside device.

Optionally, the communication unit 601 is further configured to receive the second video from the first roadside device, and send the first video and the second video to a cloud server.

Optionally, the communication unit 601 is further configured to send the first video to the cloud server.

In an example, the apparatus 600 can implement the steps performed by the first roadside device in the procedure shown in FIG. 2. The apparatus 600 may be the first roadside device, or a chip or a circuit configured in the first roadside device. The communication unit 601 performs receiving and sending operations of the first roadside device in the procedure shown in FIG. 2. The processing unit 602 is configured to perform the processing-related operation in the procedure shown in FIG. 2.

For example, the communication unit 601 is configured to receive the first monitoring request from the first vehicle, where the first monitoring request is used to request the first roadside device to record the abnormal event of the first vehicle. The processing unit 602 is configured to record the abnormal event of the first vehicle, to obtain the second video.

Optionally, the communication unit 601 is further configured to receive the second monitoring request from the first vehicle, where the second monitoring request is used to request the feedback information of the roadside device that is in the surrounding roadside device and that can monitor the abnormal event of the first vehicle, and when the first roadside device determines that the first roadside device can monitor the abnormal event of the first vehicle, send feedback information to the first vehicle, where the feedback information indicates that the first roadside device can monitor the abnormal event of the first vehicle.

Optionally, the first monitoring request carries the identification information of the first roadside device, and/or carries the identification information indicating the communication type of the first monitoring request. The second monitoring request carries the location information of the first vehicle, and/or carries the identification information indicating the communication type of the second monitoring request. The feedback information carries the identification information of the first roadside device, and/or carries location information of the first roadside device.

Optionally, the communication unit 601 is further configured to send the second video to the first vehicle, or send the second video to the cloud server.

In an example, the apparatus 600 can implement the steps performed by the cloud server in the procedure shown in FIG. 2. The apparatus 600 may be the cloud server, or a chip or a circuit configured in the cloud server. The communication unit 601 performs receiving and sending operations of the cloud server in the procedure shown in FIG. 2. The processing unit 602 is configured to perform the processing-related operation in the procedure shown in FIG. 2.

For example, the communication unit 601 is configured to receive the first video and the second video from the first vehicle, where the first video is a video that is of the abnormal event of the first vehicle and that is recorded by the first vehicle, and the second video is a video that is of the abnormal event of the first vehicle and that is recorded by the first roadside device. The processing unit 602 is configured to determine the abnormal event of the first vehicle based on the first video and the second video. Alternatively, the communication unit 601 is configured to receive the first video from the first vehicle, where the first video is a video that is of the abnormal event of the first vehicle and that is recorded by the first vehicle. The communication unit 601 is further configured to receive the second video from the first roadside device, where the second video is a video that is of the abnormal event of the first vehicle and that is recorded by the first roadside device. The processing unit 602 is further configured to determine the abnormal event of the first vehicle based on the first video and the second video.

In an example, the apparatus 600 can implement the steps performed by the first vehicle in the procedure shown in FIG. 4. The apparatus 600 may be the first vehicle, or the chip or the circuit configured in the first vehicle. The communication unit 601 performs receiving and sending operations of the first vehicle in the procedure shown in FIG. 4. The processing unit 602 is configured to perform a processing-related operation in the procedure shown in FIG. 4.

For example, the processing unit 602 is configured to determine luminance of an ambient environment of the first vehicle when the abnormal event is detected. The communication unit 601 is configured to send a lighting request to the first roadside device when the luminance of the ambient environment of the first vehicle is less than or equal to a first threshold, where the lighting request is used to request the first roadside device to start a lighting system.

Optionally, the lighting request carries the location information of the first vehicle, and/or carries indication information used to indicate a communication type of the lighting request.

In an example, the apparatus 600 can implement the steps performed by the first roadside device in the procedure shown in FIG. 4. The apparatus 600 may be the first roadside device, or the chip or the circuit configured in the first roadside device. The communication unit 601 performs receiving and sending operations of the first roadside device in the procedure shown in FIG. 4. The processing unit 602 is configured to perform the processing-related operation in the procedure shown in FIG. 4.

For example, the communication unit 601 is configured to receive the lighting request from the first vehicle, where the lighting request is used to request the first roadside device to start the lighting system. The processing unit 602 is configured to start the lighting system.

Optionally, the lighting request carries the location information of the first vehicle, and/or carries the indication information indicating the communication type of the lighting request.

In this embodiment of this disclosure, division into the units is an example, and is merely logical function division. During actual implementation, another division manner may be used. In addition, functional units in this embodiment of this disclosure may be integrated into one processor, or each of the units may exist alone physically, or two or more units may be integrated into one unit. The integrated unit may be implemented in a form of hardware, or may be implemented in a form of a software function unit.

It can be understood that in the foregoing embodiment, functions of the communication unit can be implemented by a transceiver, and functions of the processing unit can be implemented by a processor. The transceiver may include a transmitter and/or a receiver, to respectively implement functions of a sending unit and/or a receiving unit. Descriptions are provided below by way of example with reference to FIG. 7.

Figure 7:
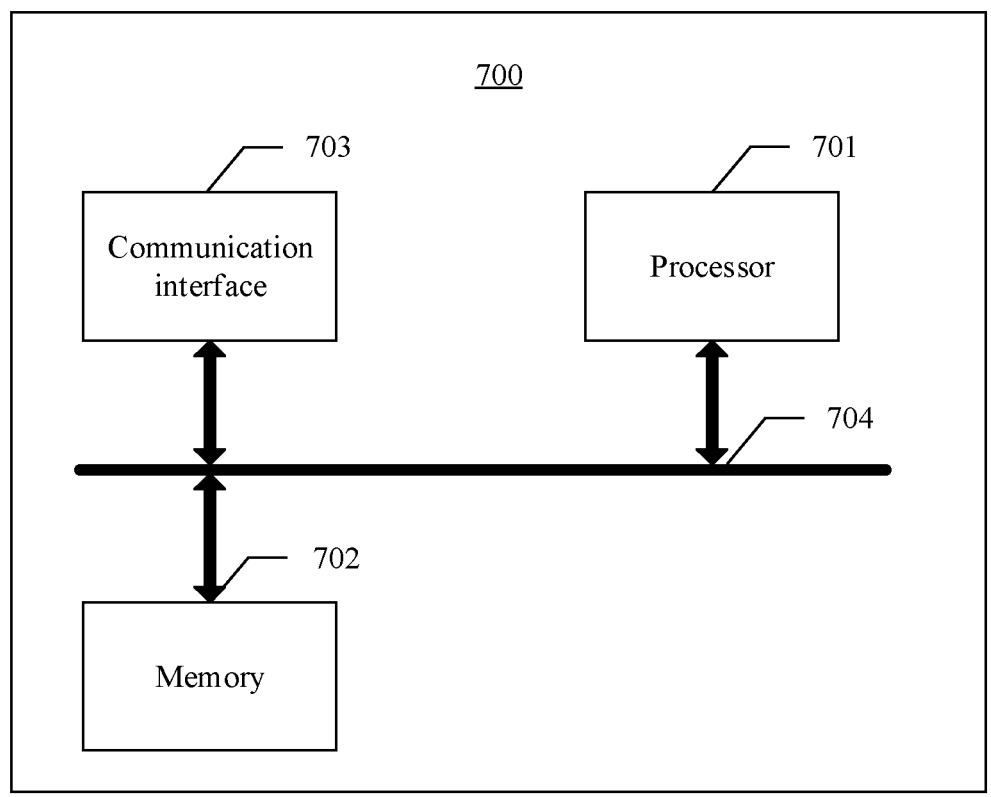
FIG. 7 is a schematic diagram of another structure of an apparatus according to an embodiment of this disclosure.

FIG. 7 is a schematic block diagram of an apparatus 700 according to an embodiment of this disclosure. The apparatus 700 shown in FIG. 7 may be an implementation of a hardware circuit of the apparatus shown in FIG. 6. The apparatus is applicable to the procedure shown in FIG. 2 or FIG. 4, and performs functions of the first vehicle, the first roadside device, or the cloud server in the foregoing method embodiments. For ease of description, FIG. 7 shows only main components of the communication apparatus.

The communication apparatus 700 shown in FIG. 7 includes at least one processor 701. The communication apparatus 700 may further include at least one memory 702 configured to store program instructions and/or data. The memory 702 is coupled to the processor 701. The coupling in this embodiment of this disclosure is an indirect coupling or a communication connection between apparatuses, units, or modules, may be in an electrical form, a mechanical form, or another form, and is used for information exchange between the apparatuses, the units, or the modules. The processor 701 may cooperate with the memory 702, the processor 701 may execute program instructions stored in the memory 702, and at least one of the at least one memory 702 may be included in the processor 701.

The apparatus 700 may further include a communication interface 703 configured to communicate with another device by using a transmission medium, so that the communication apparatus 700 may communicate with the other device. In this embodiment of this disclosure, the communication interface may be a transceiver, a circuit, a bus, a module, or a communication interface of another type. In this embodiment of this disclosure, when the communication interface is the transceiver, the transceiver may include an independent receiver and an independent transmitter, or may be a transceiver integrated with a transceiver function or an interface circuit.

It should be understood that connection media between the processor 701, the memory 702, and the communication interface 703 are not limited in this embodiment of this disclosure. In this embodiment of this disclosure, in FIG. 7, the memory 702, the processor 701, and the communication interface 703 are connected with each other by using a communication bus 704. The bus is represented by a thick line in FIG. 7, and connection manners of other components are merely for schematic descriptions and are not construed as a limitation. The bus may include an address bus, a data bus, a control bus, and the like. For ease of representation, in FIG. 7, only one thick line is used for representation, but it does not mean that there is only one bus, only one type of bus, or the like.

In an example, the apparatus 700 is configured to implement the steps performed by the first vehicle in the procedure shown in FIG. 2. The communication interface 703 is configured to perform sending and receiving-related operations of the first vehicle in the foregoing embodiments. The processor 701 is configured to perform a processing-related operation of the first vehicle in the foregoing method embodiments.

For example, the processor 701 is configured to start a monitoring device inside the first vehicle when an abnormal event is detected, where the monitoring device is configured to record a first video of the abnormal event after being started. The processor 701 is further configured to determine a first roadside device in an area where the first vehicle is located. The communication interface 703 is configured to send a first monitoring request to the first roadside device, where the first monitoring request is used to request the first roadside device to record a second video of the abnormal event, and the first video and the second video are used to trace the abnormal event.

Optionally, the processor 701 is configured to determine the first roadside device in an area where the first vehicle is located, and control the communication interface 703 to send a second monitoring request to a surrounding roadside device, where the second monitoring request is used to request feedback information of a roadside device that is in the surrounding roadside device and that can monitor the abnormal event of the first vehicle. The communication interface 703 receives feedback information sent by one or more roadside devices including the first roadside device, where the feedback information indicates that the one or more roadside devices can monitor the abnormal event of the first vehicle, and determines the first roadside device from the one or more roadside devices.

Optionally, the first monitoring request carries identification information of the first roadside device, and/or carries identification information indicating a communication type of the first monitoring request. The second monitoring request carries location information of the first vehicle, and/or carries identification information indicating a communication type of the second monitoring request. The feedback information carries identification information of a corresponding roadside device, and/or carries location information of the corresponding roadside device.

Optionally, the communication interface 703 is further configured to receive the second video from the first roadside device, and send the first video and the second video to a cloud server.

Optionally, the communication interface 703 is further configured to send the first video to the cloud server.

In an example, the apparatus 700 is configured to implement the steps performed by the first roadside device in the procedure shown in FIG. 2. The communication interface 703 is configured to perform sending and receiving-related operations of the first roadside device in the foregoing embodiments. The processor 701 is configured to perform a processing-related operation of the first roadside device in the foregoing method embodiments.

For example, the communication interface 703 is configured to receive the first monitoring request from the first vehicle, where the first monitoring request is used to request the first roadside device to record the abnormal event of the first vehicle. The processor 701 is configured to record the abnormal event of the first vehicle, to obtain the second video.

Optionally, the communication interface 703 is further configured to receive the second monitoring request from the first vehicle, where the second monitoring request is used to request the feedback information of the roadside device that is in the surrounding roadside device and that can monitor the abnormal event of the first vehicle, and when the first roadside device determines that the first roadside device can monitor the abnormal event of the first vehicle, send feedback information to the first vehicle, where the feedback information indicates that the first roadside device can monitor the abnormal event of the first vehicle.

Optionally, the first monitoring request carries the identification information of the first roadside device, and/or carries the identification information indicating the communication type of the first monitoring request. The second monitoring request carries the location information of the first vehicle, and/or carries the identification information indicating the communication type of the second monitoring request. The feedback information carries the identification information of the first roadside device, and/or carries location information of the first roadside device.

Optionally, the communication interface 703 is further configured to send the second video to the first vehicle, or send the second video to the cloud server.

In an example, the apparatus 700 is configured to implement the steps performed by the cloud server in the procedure shown in FIG. 2. The communication interface 703 is configured to perform receiving and sending-related operations of the cloud server in the foregoing embodiments. The processor 701 is configured to perform a processing-related operation of the cloud server in the foregoing method embodiments.

For example, the communication interface 703 is configured to receive the first video and the second video from the first vehicle, where the first video is a video that is of the abnormal event of the first vehicle and that is recorded by the first vehicle, and the second video is a video that is of the abnormal event of the first vehicle and that is recorded by the first roadside device. The processor 701 is configured to determine the abnormal event of the first vehicle based on the first video and the second video. Alternatively, the communication interface 703 is configured to receive the first video from the first vehicle, where the first video is a video that is of the abnormal event of the first vehicle and that is recorded by the first vehicle. The communication interface 703 is further configured to receive the second video from the first roadside device, where the second video is a video that is of the abnormal event of the first vehicle and that is recorded by the first roadside device. The processor 701 is further configured to determine the abnormal event of the first vehicle based on the first video and the second video.

In an example, the apparatus 700 is configured to implement the steps performed by the first vehicle in the procedure shown in FIG. 4. The communication interface 703 is configured to perform sending and receiving-related operations of the first vehicle in the foregoing embodiments. The processor 701 is configured to perform a processing-related operation of the first vehicle in the foregoing method embodiments.

For example, the processor 701 is configured to determine luminance of an ambient environment of the first vehicle when the abnormal event is detected. The communication interface 703 is configured to send a lighting request to the first roadside device when the luminance of the ambient environment of the first vehicle is less than or equal to a first threshold, where the lighting request is used to request the first roadside device to start a lighting system.

Optionally, the lighting request carries the location information of the first vehicle, and/or carries indication information used to indicate a communication type of the lighting request.

In an example, the apparatus 700 is configured to implement the steps performed by the first roadside device in the procedure shown in FIG. 7. The communication interface 703 is configured to perform sending and receiving-related operations of the first roadside device in the foregoing embodiments. The processor 701 is configured to perform the processing-related operation of the first roadside device in the foregoing method embodiments.

For example, the communication interface 703 is configured to receive the lighting request from the first vehicle, where the lighting request is used to request the first roadside device to start the lighting system. The processor 701 is configured to start the lighting system.

Optionally, the lighting request carries the location information of the first vehicle, and/or carries the indication information indicating the communication type of the lighting request.

Further, an embodiment of this disclosure further provides an apparatus. The apparatus is configured to perform the method in the procedure shown in FIG. 2, or is configured to perform the method in the procedure shown in FIG. 4. A computer-readable storage medium includes a program. When the program is run by a processor, the method in the procedure shown in FIG. 2 is performed, or the method in the procedure shown in FIG. 4 is performed. A computer program product includes computer program code. When the computer program code is run on a computer, the computer is enabled to implement the method in the procedure shown in FIG. 2 or the method in the procedure shown in FIG. 4. A chip includes a processor. The processor is coupled to a memory, and the memory is configured to store a program or instructions. When the program or the instructions is executed by the processor, the apparatus is enabled to perform the method in the process shown in FIG. 2 or the method in the process shown in FIG. 4. In this embodiment of this disclosure, the processor may be a general-purpose processor, a digital signal processor, an application-specific integrated circuit, a field programmable gate array or another programmable logic device, a discrete gate or transistor logic device, or a discrete hardware component. The processor can implement or perform the methods, the steps, and the logical block diagrams disclosed in embodiments of this disclosure. The general-purpose processor may be a microprocessor, any conventional processor, or the like. The steps of the methods disclosed with reference to embodiments of this disclosure may be directly performed and completed by a hardware processor, or may be performed and completed by using a combination of hardware in the processor and a software module.

In embodiments of this disclosure, the memory may be a non-volatile memory, such as a hard disk drive (HDD) or a solid-state drive (SSD), or may be a volatile memory, such as a random-access memory (RAM). The memory is any other medium that can be used to carry or store expected program code in a form of instructions or a data structure and that can be accessed by a computer. However, this is not limited thereto. The memory in embodiments of this disclosure may alternatively be a circuit or any other apparatus that can implement a storage function, and is configured to store program instructions and/or data.

All or some of the methods in embodiments of this disclosure may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of procedures or functions according to embodiments of the present application are generated. The computer may be a general-purpose computer, a dedicated computer, a computer network, a network device, user equipment, or another programmable apparatus. The computer instructions may be stored in the computer-readable storage medium or may be transmitted from one computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DIGITAL VERSATILE DISC (DVD)), a semiconductor medium (for example, an SSD), or the like.

It is clear that a person skilled in the art can make various modifications and variations to this disclosure without departing from the scope of this disclosure. This disclosure is intended to cover these modifications and variations of this disclosure provided that they fall within the scope of the claims of this disclosure and equivalent technologies thereof

What is claimed is:

1. An apparatus comprising at least one processor and at least one memory, wherein the at least one memory is configured to store program instructions, and the at least one processor is coupled to the at least one memory to execute the instructions to:
   start a monitoring device inside a first vehicle when an abnormal event is detected, wherein the monitoring device is configured to record a first video of the abnormal event after being started;
   send a first monitoring request to a first roadside device in an area where the first vehicle is located, wherein the first monitoring request is used to request the first roadside device to record a second video of the abnormal event, and the first video and the second video are used to trace the abnormal event;
   send a second monitoring request to at least one surrounding roadside device, wherein the second monitoring request is used to request feedback information of one or more roadside devices that can monitor the abnormal event of the first vehicle, of the at least one surrounding roadside device; and
   receive feedback information from the one or more roadside devices comprising the first roadside device, wherein the feedback information indicates that the one or more roadside devices can monitor the abnormal event of the first vehicle.

2. The apparatus according to claim 1, wherein the first monitoring request carries first identification information of the first roadside device and carries second identification information indicating a communication type of the first monitoring request, wherein the second monitoring request carries location information of the first vehicle and carries third identification information indicating a communication type of the second monitoring request, and wherein the feedback information carries fourth identification information of a corresponding roadside device and carries location information of the corresponding roadside device.

3. The apparatus according to claim 1, wherein the at least one processor is coupled to the at least one memory to execute the instructions to:
   receive the second video from the first roadside device; and
   send the first video and the second video to a cloud server.

4. The apparatus according to claim 1, wherein the at least one processor is coupled to the at least one memory to execute the instructions to: send, the first video to a cloud server.

5. An apparatus comprising at least one processor and at least one memory, wherein the at least one memory is configured to store program instructions, and the at least one processor is coupled to the at least one memory to execute the instructions to:
   receive a first monitoring request from a first vehicle, wherein the first monitoring request is used to request a first roadside device to record an abnormal event of the first vehicle;
   record the abnormal event of the first vehicle in order to obtain a second video;
   receive a second monitoring request from the first vehicle, wherein the second monitoring request is used to request feedback information of at least one surrounding roadside device that can monitor the abnormal event of the first vehicle; and
   send feedback information to the first vehicle indicating that the first roadside device can monitor the abnormal event of the first vehicle.

6. The apparatus according to claim 5, wherein the first monitoring request carries first identification information of the first roadside device and carries second identification information indicating a communication type of the first monitoring request, wherein the second monitoring request carries location information of the first vehicle and carries third identification information indicating a communication type of the second monitoring request, and wherein the feedback information carries fourth identification information of the first roadside device and carries location information of the first roadside device.

7. The apparatus according to claim 5, wherein the at least one processor is coupled to the at least one memory to execute the instructions to: send, the second video to the first vehicle.

8. The apparatus according to claim 5, wherein the at least one processor is coupled to the at least one memory to execute the instructions to: send, the second video to a cloud server.

9. An apparatus comprising at least one processor and at least one memory, wherein the at least one memory is configured to store program instructions, and the at least one processor is coupled to the at least one memory to execute the instructions to send, in response to an abnormal event being detected, a lighting request to a first roadside device when luminance of an ambient environment of a first vehicle is less than or equal to a first threshold, wherein the lighting request is used to request the first roadside device to start a lighting system.

10. The apparatus according to claim 9, wherein the lighting request carries location information of the first vehicle and carries indication information used to indicate a communication type of the lighting request.

11. The apparatus according to claim 9, wherein the lighting request carries location information of the first vehicle.

12. The apparatus according to claim 9, wherein the lighting request carries indication information indicating a communication type of the lighting request.

13. The apparatus according to claim 1, wherein the first monitoring request carries first identification information of the first roadside device or information indicating a communication type of the first monitoring request, wherein the second monitoring request carries location information of the first vehicle or second identification information indicating a communication type of the second monitoring request, and wherein the feedback information carries third identification information of a corresponding roadside device or location information of the corresponding roadside device.

14. The apparatus according to claim 1, wherein the first monitoring request carries first identification information of the first roadside device and second identification information indicating a communication type of the first monitoring request, wherein the second monitoring request carries location information of the first vehicle and third identification information indicating a communication type of the second monitoring request, and wherein the feedback information carries fourth identification information of a corresponding roadside device.

15. The apparatus according to claim 1, wherein the first monitoring request carries first identification information of the first roadside device and second identification information indicating a communication type of the first monitoring request, wherein the second monitoring request carries location information of the first vehicle and third identification information indicating a communication type of the second monitoring request, and wherein the feedback information carries location information of a corresponding roadside device.

16. The apparatus according to claim 5, wherein the first monitoring request carries first identification information of the first roadside device or second identification information indicating a communication type of the first monitoring request, wherein the second monitoring request carries location information of the first vehicle or third identification information indicating a communication type of the second monitoring request, and wherein the feedback information carries the first identification information or location information of the first roadside device.

17. The apparatus according to claim 5, wherein the first monitoring request carries first identification information of the first roadside device and second identification information indicating a communication type of the first monitoring request, wherein the second monitoring request carries location information of the first vehicle and third identification information indicating a communication type of the second monitoring request, and wherein the feedback information carries the first identification information of the first roadside device.

18. The apparatus according to claim 5, wherein the first monitoring request carries first identification information of the first roadside device and second identification information indicating a communication type of the first monitoring request, wherein the second monitoring request carries location information of the first vehicle and third identification information indicating a communication type of the second monitoring request, and wherein the feedback information carries location information of the first roadside device.

* * * * *